Jan. 21, 1969     H. N. BRAUNHUT     3,423,149
ADJUSTABLE POLARIZING EYEGLASSES

Filed Jan. 21, 1965     Sheet 1 of 2

INVENTOR
HAROLD N. BRAUNHUT
BY Friedman & Goodman
ATTORNEYS

Jan. 21, 1969   H. N. BRAUNHUT   3,423,149
ADJUSTABLE POLARIZING EYEGLASSES
Filed Jan. 21, 1965
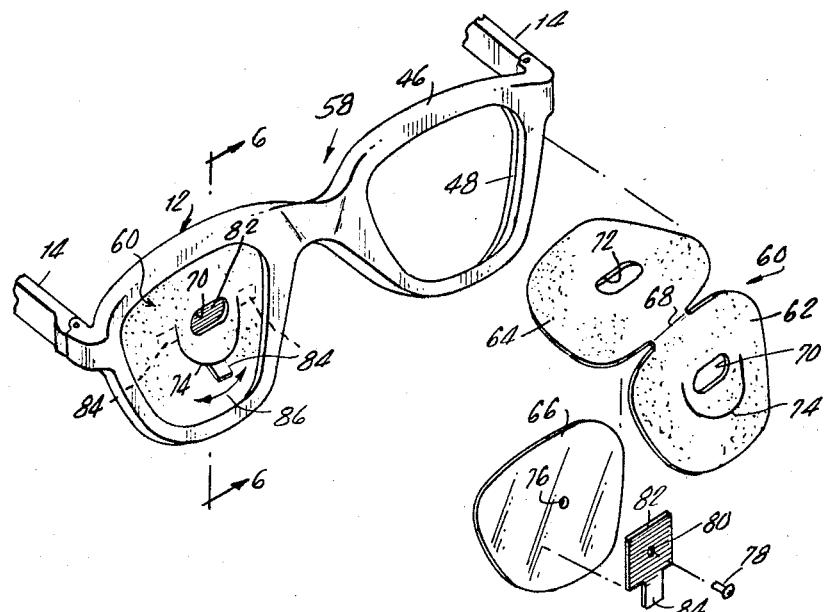
FIG. 5
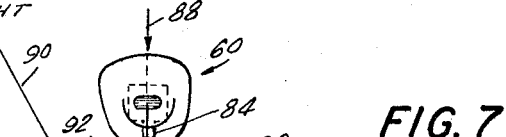
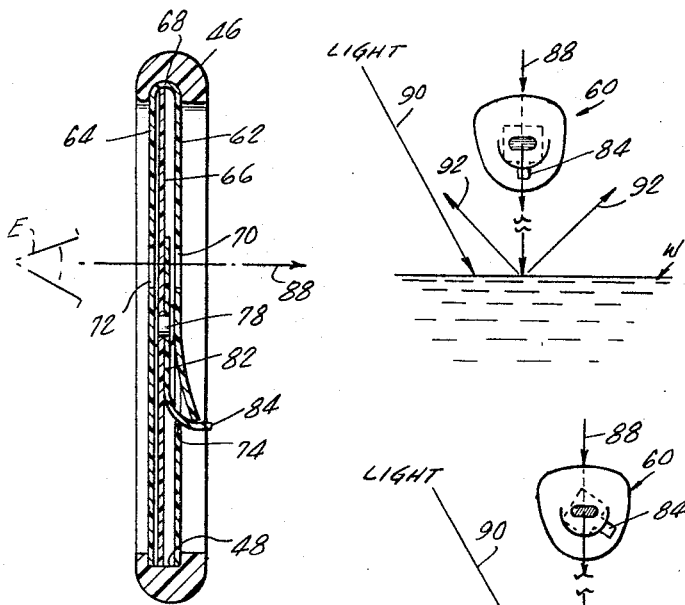
FIG. 6
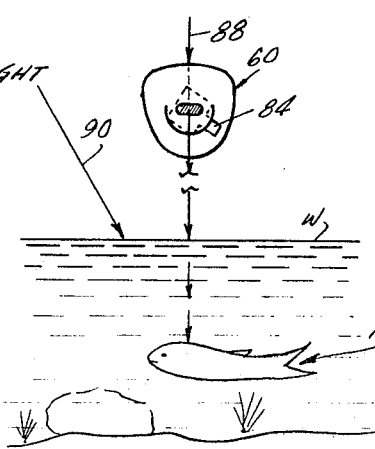
FIG. 7
FIG. 8
INVENTOR
HAROLD N. BRAUNHUT
BY
ATTORNEYS

United States Patent Office

3,423,149
Patented Jan. 21, 1969

3,423,149
ADJUSTABLE POLARIZING EYEGLASSES
Harold N. Braunhut, 1812 Atlantic Ave.,
Brooklyn, N.Y. 11233
Filed Jan. 21, 1965, Ser. No. 427,029
U.S. Cl. 351—49     3 Claims
Int. Cl. G02c 7/12

ABSTRACT OF THE DISCLOSURE

A pair of eyeglasses comprising a lens frame provided with a pair of lens means, at least one of which is opaque and having a predetermined transparent portion, and adjustable light polarizing means comprising at least one polarizing element operable at the transparent portion, said light polarizing element being pivotally mounted on support means therefor positioned between said lens means.

---

The present invention relates in general to eyeglasses or spectacles and in particular to eyeglasses provided with light polarizing lenses.

It is an object of the present invention to provide light polarizing lenses for a pair of eyeglasses or the like which can be manufactured and sold at a relatively low price, but which, nevertheless, are highly efficient in operation.

It is another object of the present invention to provide a pair of sunglasses having light polarizing lenses which are adjustable so as to vary the degree or amount of light polarization.

It is another object of the present invention to provide a pair of eyeglasses or spectacles which are especially adapted to reduce the glare reflected by the surface of a body of water so as to permit the viewer to see through the body of water.

Other and further objects and advantages of the present invention will be readily apparent to one skilled in the art from a consideration of the following specification taken in connection with the appended drawings.

In the drawings which illustrate the best modes presently contemplated for carrying out the invention:

FIGURE 5 is an exploded view of a pair of eyeglasses especially suitable for viewing through a body of water;

FIGURE 6 is a sectional view on an enlarged scale taken on the line 6—6 of FIGURE 5; and FIGURES 7 and 8 are more or less diagrammatic illustrations to illustrate the operation of the lenses in the eyeglasses illustrated in FIGURE 5.

Figure 1:
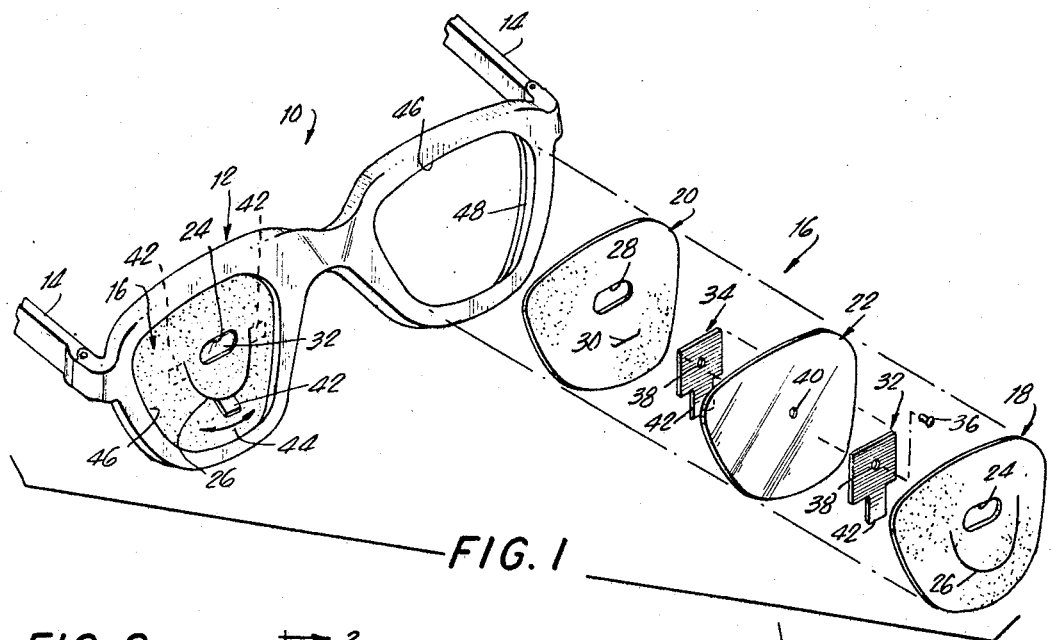
FIGURE 1 is an exploded view of a pair of sunglasses pursuant to the present invention.
Figure 2:
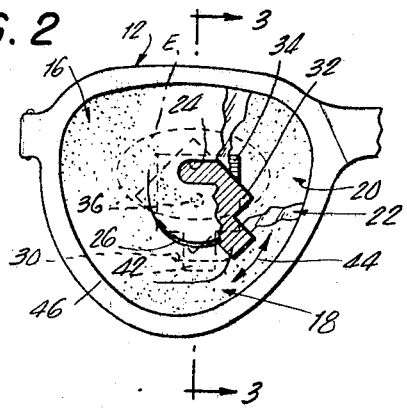
FIGURE 2 is a fragmentary detail view of a portion of FIGURE 1 with parts removed and broken away for purposes of illustration.

Referring now to FIGURES 1 through 4 in detail, FIGURE 1 illustrates a pair of eyeglasses or spectacles 10 pursuant to the present invention. As here shown, the pair of eyeglasses 10 is provided with a conventional lens frame 12 which is provided with a pair of temples 14. The lens frame 12 is provided with a pair of lens assemblies 16 pursuant to the present invention. Each lens assembly 16 is provided with an opaque front lens member 18, an opaque rear lens member 20 and a transparent center or intermediate lens member 22. As here shown, the front lens member 18 is provided with an elongated aperture 24 and with an arcuate slit 26 below the aperture 24. The rear lens member 20 is provided also with an elongated aperture 28 which is similar to aperture 24 and with a horizontal slit 30 centered below the aperture 28. Provision is also made for a pair of light polarizing sheet material members 32 and 34 which are secured to the opposite surfaces, respectively, of the intermediate lens member 22 by means of a rivet 36 which extends through apertures 38 provided in the respective members and an aperture 40 provided substantially centrally of the intermediate lens member 22. Each member 32 and 34 is substantially square shaped and is provided with a tab or extension 42.

Figure 3:
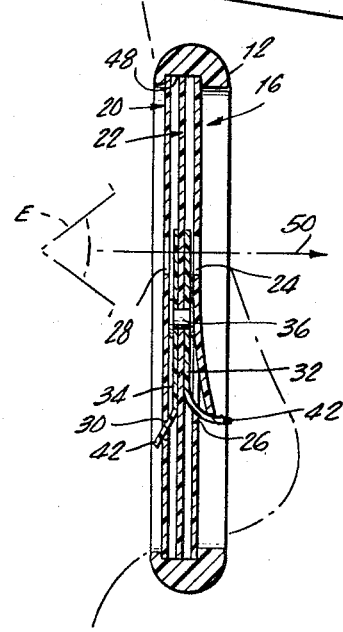
FIGURE 3 is a sectional view on an enlarged scale taken on the line 3—3 of FIGURE 2.

In assembling the lens assemblies 16, the members 32 and 34 are mounted at the opposite surfaces of the intermediate lens member 22 by means of the rivet 36 which extends through the aligned apertures 38 of the respective members which are in registry with the aperture 40 of the intermediate lens member 22, which is intermediate the aligned apertures 38, so that the rivet 36 passes therethrough as shown in FIGURE 3. The front lens member 18 is positioned forwardly of the intermediate lens member 22 and the tab or finger piece 42 of the element 32 is inserted or passed through the arcuate slit 26 of the front lens member 18 so that the finger piece 42 projects forwardly from the front lens member 18, as best shown in FIGURE 3. The rear lens member 20 is disposed rearwardly of the intermediate lens member 22 and the tab 42 of the element 34 is inserted into and passed through the horizontal slit 30 in the rear of lens member 20, as shown in FIGURE 3. It will be understood that the tab 42 seats in the slit 30 with substantially no horizontal play so that the rear element 34 is immobilized against movement relative to the lens assembly 16. However, it will be understood that the finger piece 42 on the front element 32 is free to move along the extent of the arcuate slit 26, in opposite directions therealong, as indicated by the arrowheads 44 in FIGURE 2.

The lens frame 12 is provided with a pair of conventional lens mounts 46 each of which is provided with a recessed seat 48 adapted to receive a lens assembly 16, as best shown in FIGURE 3. It will be noted that the finger piece or tab 42 on the member 32 extends forwardly or outwardly from the pair of eyeglasses 10 and, as previously indicated, is free for arcuate movement within the slit 26 as indicated by the arrowheads 44. The finger piece or tab 42 provided on the member 34 is provided at the inner side of the pair of eyeglasses 10, as best shown in FIGURE 3 and is immobolized within the slit 30 in the rear lens member 20. Consequently, it will be apparent that the element 32 is freely moveable as indicated by the arrows 44 with respect to the immobolized element 34.

Figure 4:
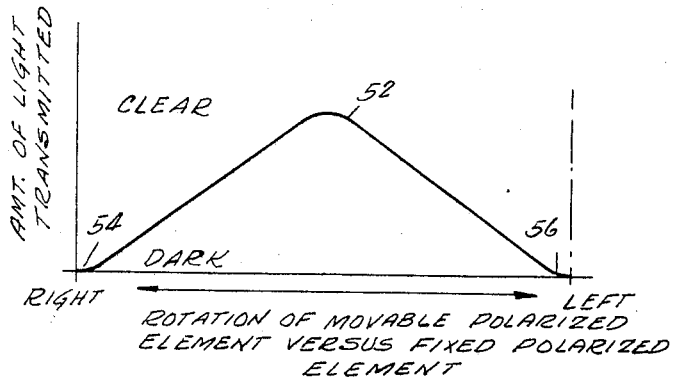
FIGURE 4 is a graph which illustrates the amount of light which passes through the lenses of the eyeglasses illustrated in FIGURE 1 as the lenses are adjusted in accordance with the present invention.

When the pair of eyeglasses 10 is mounted on the head of the viewer, the aligned apertures 24 and 28 will be at the level of the viewer's eye E so that the viewer, through each eye, can look through the aligned apertures 24 and 28 of the associated lens assembly 16, as indicated by the arrow 50. As previously indicated the front lens members 18 and the rear lens members 20 are opaque and light is transmitted therethrough only through the apertures 24 and 28 therein. Also, as previously indicated the intermediate lens member 22 is transparent. From the foregoing, it will be apparent that the light striking the viewer's eye E is controlled by the two elements 32 and 34 through which the light must pass through the aligned apertures 24 and 28 and the intermediate transparent lens member 22 which is straddled by the elements 32 and 34 of which the element 32 is freely rotatable about the rivet 36 within the confines of the slit 26, whereas the rear element 34 is rendered immobilized or stationary as previously described. Each of the polarized discs 32 and 34 is individually quite transparent. However, when the two of them are placed together on the opposite sides of the transparent intermediate lens member 22 the degree of transparency of the combination of the elements 32 and 34 depends upon the relative orientation of the elements. The degree of transparency can be varied from ready transmission of light to almost total opacity simply by rotating the element 32 with respect to the fixed element 34. This feature of the present invention is illustrated in FIGURE 4. For example, with the elements 32 and 34 both oriented in exactly the same manner as illustrated in the disposition of the elements shown in FIGURE 1, there will be a maximum transmission of light therethrough when the tab 42 of the front element 32 is in the center of the slot 26 at which point it will be in registry with the tab 42 of the rear element 34 so that there will be maximum light transmission as indicated at point 52 on the graph illustrated in FIGURE 4 at which point there will be a clear unobstructed light transmission through the aligned apertures 24 and 28 of each lens assembly 16. However, the movement of the tab 42 of the front element 32, either to the right or to the left of its intermediate position, will gradually decrease the light transmission through the lens assemblies as the degree of rotation of the front element relative to the rear element increases, so that the light transmission through each lens assembly decreases to the point where each lens assembly appears to be dark, when looking through the aligned apertures 24 and 28 when the front tab 42 is positioned at each end of the slit 26, as indicated at the points 54 and 56 in FIGURE 4.

In view of the foregoing, it will be apparent that the pair of eyeglasses 10 is highly suitable for use as a pair of sunglasses. By the relative orientation of the element 32 with respect to the fixed element 34 the amount of light from the sun reaching the eye of the viewer can be controlled by controlling the degree of opacity of each of the lens assemblies. In view of the fact that only relatively small pieces of elements are used for the elements 32 and 34 the eyeglasses 10 may be manufactured at a relatively low price since the remaining parts thereof are relatively inexpensive, the elements usually constituting the most expensive portions of sunglasses.

Referring now to FIGURES 5 through 8 in detail, there is shown another embodiment of the present invention pursuant to which there is provided a pair of eyeglasses or spectacles 58 which is eminently suitable for use in looking through bodies of water W. The eyeglasses 58, as here shown, comprises a conventional lens frame 12 having a pair of temples 14 and provided with a pair of lens assemblies 60. As here shown, each lens assembly 60 is provided with a front lens member 62, a rear lens member 64 and an intermediate lens member 66. The front and rear lens members are joined by an integral hinge portion 68. The front and rear lens members are formed of opaque material, preferably a suitable plastic, the front lens member being provided with an aperture 70 and the rear lens member being provided with an aperture 72. The apertures 70 and 72 are of similar dimension and are disposed in the same portions of the associated lens members so that when the front and rear lens members are in abutment the apertures are in registry. The front lens member 62 is provided also with an arcuate slit 74 below the associated aperture 70. The intermediate lens member 66 is formed of a suitable transparent material, preferably a suitable plastic, and is provided with a central aperture 76 which is adapted to receive a rivet 78 which is adapted to extend through an aperture 80 provided in an element 82 adapted to be mounted on the front surface of the intermediate lens member 66 by means of the rivet 78. The element 82 is provided with a finger piece or tab 84 which is adapted to extend through the slot 74 in the front lens member 62, as shown in FIGURE 5. It will be apparent that each element 82 is mounted for rotation about the rivet 78 by movement of the projecting tab 84, said movement being limited by the extent of the slit 74, the tab being moveable as indicated by the arrows 86 to position the tab 84 in either of the broken line positions thereof shown in FIGURE 5.

The frame 12 is provided with a pair of lens mounts 46 each of which is provided with a lens seat 48. Each recessed lens seat 48 is adapted to receive a lens assembly 60 as best shown in FIGURE 6. It will be noted that when each lens assembly 60 is seated within its associated lens mount 46 the finger piece or tab 84 projects forwardly of the eyeglasses or spectacles 10. When the eyeglasses 58 are worn on the head of a viewer, the viewer's eye E is aligned with the registry apertures 70 and 72 so that the viewer can look therethrough, as indicated by the arrow 88.

When light, as indicated by the arrow 90 in FIGURES 7 and 8, strikes the surface of a body of water W, the light is reflected from the surface of the water, as indicated for example by arrowheads 92, in many different directions so that the glare is produced and it is very difficult if not impossible to see through the water. However, the effect of the glare can be greatly reduced and eliminated through the polarization of light through the element 82. For example, with the tab 84 positioned as illustrated in FIGURE 7 the reflected light is polarized in a horizontal direction by the element 82. However, as the tab 84 is moved along the slot 74, from the intermediate position thereof shown in FIGURE 7 toward an outer position thereof as shown in FIGURE 8, the reflected light is polarized at different angles with the result that the viewer looking along the line indicated by the arrows 88 in FIGURES 7 and 8 can see through the body of water W and, for example, see a fish F or other marine life in the water. Consequently, it will be apparent that as the element 82 has its orientation varied by means of adjusting the position of the finger piece or tab 84 the reflected light is filtered at different angles of polarization and the glare is eliminated. Consequently, the eyeglasses 58 will be extremely helpful for observing fish or other marine life within a body of water which fish or marine life would normally not be visible as a result of the glare of the reflected light from the surface of the water.

In view of the foregoing, it will be apparent that there has been illustrated and described a highly novel pair of glasses which, in one embodiment, can be used for viewing marine life. It will be understood that various changes and modifications may be made therein without, however, departing from the basic inventive concept of the present invention.

I claim:

1. In a pair of eyeglasses, an opaque lens assembly comprising an opaque front lens member, an opaque rear lens member, said lens members each having an elongated sight aperture defined therein, said apertures being in registry, said front lens member being provided with an arcuate slit below its respective sight aperture, and adjustable light polarizing means operable at said apertures, said light polarizing means further comprising a light polarizing element pivotally mounted on support means therefor, said support means positioned between said front and rear lens members, said light polarizing means being substantially square shaped and having a finger piece provided thereon, said finger piece downwardly extending through said slit for movement therealong, whereby the orientation of said polarizing element may be varied so that the amount of light passing through said sight apertures may be controlled by the pivotal movement of said light polarizing element.

2. In a pair of eyeglasses, an opaque lens assembly comprising an opaque front lens member, an opaque rear lens member, said lens members each having an elongated sight aperture defined therein, said apertures being in registry, said front lens member being provided with an arcuate slit below its respective sight aperture, said rear lens member being provided with a horizontal slit centered below its respective sight aperture, an intermediate transparent lens member mounted between said front and rear lens members, and adjustable light polarizing means operable at said apertures, said light polarizing means further comprising a first light polarizing element and a second light polarizing element, each of said light polarizing elements being substantially square shaped and having a finger piece provided thereon, said first and second light polarizing elements being commonly mounted to said intermediate lens member by means of a rivet about which both polarizing elements are rotatable, said first element being located between said intermediate lens member and said rear lens member and being fixed in position therebetween, by having its respective finger piece downwardly extending through said horizontal slit in said rear lens member, to overlie the aperture in said rear lens member, and said second element being located between said intermediate lens member and said front lens member and being rotatably mounted therebetween, by having its respective finger piece downwardly extending through said arcuate slit for movement therealong, to overlie the aperture in said front lens member, whereby the orientation of said second element is variable relative to the orientation of said first element so that the amount of light passing through the said sight apertures may be controlled by the pivotal movement of said second light polarizing element relative to the fixed position of said first polarizing element.

3. In a pair of eyeglasses, an opaque lens assembly comprising an opaque front lens member, an opaque rear lens member, both lens members being integral, said lens members each having an elongated sight aperture defined therein, said apertures being in registry, said front lens member being provided with an arcuate slit below its sight aperture, an intermediate transparent lens member mounted between said front and rear lens members, and adjustable light polarizing means operable at said apertures, said light polarizing means further comprising a light polarizing element disposed between said intermediate lens member and said front lens member, said light polarizing element being substantially square shaped and having a finger piece provided thereon, said light polarizing element being pivotally mounted to said intermediate lens member by means of a rivet rotatably securing said light polarizing element and intermediate lens member, said finger piece downwardly extending through said slit for movement therealong, whereby the orientation of said polarizing element may be varied so that the amount of light passing through said sight apertures may be controlled by the pivotal movement of said light polarizing element.

References Cited

UNITED STATES PATENTS

| 1,247,853 | 11/1917 | McWenie | 351—45 |
| 1,495,828 | 5/1924 | Weller | 351—47 X |
| 2,304,504 | 12/1942 | Metzger et al. | 351—49 |
| 2,384,149 | 9/1945 | Zadig | 351—165 X |
| 2,773,422 | 12/1956 | Flynn et al. | 351—49 |
| 2,789,462 | 4/1957 | Forgrave | 351—49 |

DAVID H. RUBIN, *Primary Examiner.*

U.S. Cl. X.R.

350—159